US005726928A

United States Patent [19]
Han

[11] Patent Number: 5,726,928
[45] Date of Patent: Mar. 10, 1998

[54] ARITHMETIC LOGIC UNIT CIRCUIT WITH REDUCED PROPAGATION DELAYS

[75] Inventor: Dae Keun Han, Kyungsangbook-Do, Rep. of Korea

[73] Assignee: Goldstar Electron Co., Ltd., Cheongju, Rep. of Korea

[21] Appl. No.: 624,205

[22] Filed: Apr. 3, 1996

Related U.S. Application Data

[63] Continuation of Ser. No. 379,335, Jan. 27, 1995, abandoned.

[30] Foreign Application Priority Data

Jan. 28, 1994 [KR] Rep. of Korea ............... 1583/1994

[51] Int. Cl.$^6$ ........................................... G06F 7/50
[52] U.S. Cl. ................................... 364/786; 364/784
[58] Field of Search ............................... 364/784, 786

[56] References Cited

U.S. PATENT DOCUMENTS

| | | | |
|---|---|---|---|
| 4,052,604 | 10/1977 | Maitland et al. | 364/786 |
| 4,701,877 | 10/1987 | Sahoda et al. | 364/784 |
| 4,713,790 | 12/1987 | Kloker et al. | 364/784 |
| 4,866,658 | 9/1989 | Mazin et al. | 364/784 |
| 4,905,179 | 2/1990 | Licciardi et al. | 364/786 |
| 4,931,981 | 6/1990 | Knauer | 364/784 |
| 4,970,677 | 11/1990 | Young | 364/784 |
| 4,989,174 | 1/1991 | Gardei | 364/786 |

*Primary Examiner*—Tan V. Mai
*Attorney, Agent, or Firm*—Fleshner & Kim

[57] ABSTRACT

An improved arithmetic logic operation circuit capable of advantageously reducing propagation delay due to a logic gate for obtaining a high speed arithmetic logic unit by minimizing the number of logic gates, which includes an even bit arithmetic logic unit cell for logically operating upon even bits of a first and second data and for generating a carry out signal in accordance with an inverted carry in signal, an inverted carry enable signal and an operation control signal, and an odd bit arithmetic logic unit cell for logically operating upon the odd bits of the first and second data and for generating a carry out signal in accordance with the carry in signal, a carry enable signal and the operation control signal.

24 Claims, 5 Drawing Sheets

| μA[0] | μA[1] | μA[2] | μA[3] | CYen | FUNCTION (OUT) |
|---|---|---|---|---|---|
| 0 | 0 | 1 | 1 | 0 | A |
| 0 | 1 | 0 | 1 | 0 | B |
| 0 | 0 | 0 | 1 | 0 | A AND B |
| 0 | 1 | 1 | 1 | 0 | A OR B |
| 0 | 1 | 1 | 0 | 0 | A XOR B |
|  |  |  |  | 1 | SUM(SUB) |

FIG. 5

| μA [0:3] | CYen | A | B | MUX0 | CYin | OUT | CYout |
|---|---|---|---|---|---|---|---|
| 0110 | 1 | 0 | 0 | 0 | 0 | 0 | 0 |
|  |  |  |  |  | 1 | 1 | 0 |
|  |  | 0 | 1 | 1 | 0 | 1 | 0 |
|  |  |  |  |  | 1 | 0 | 1 |
|  |  | 1 | 0 | 1 | 0 | 1 | 0 |
|  |  |  |  |  | 1 | 0 | 1 |
|  |  | 1 | 1 | 0 | 0 | 0 | 1 |
|  |  |  |  |  | 1 | 1 | 1 |

FIG. 6

ARITHMETIC LOGIC UNIT CIRCUIT WITH REDUCED PROPAGATION DELAYS

This application is a continuation of application Ser. No. 08/379,335 filed Jan. 27, 1995 abandoned.

BACKGROUND OF THE INVENTION

1. Field of the Invention

The present invention relates to an arithmetic logic unit circuit, and particularly to art improved arithmetic logic operation circuit capable of advantageously reducing propagation delay due to logic gates for providing a high speed arithmetic logic unit by minimizing the number of logic gates.

2. Description of the Conventional Art

Conventionally, an arithmetic logic unit circuit consists of a plurality of cells for performing the arithmetic logic operations under control of a main control apparatus.

Figure 1:
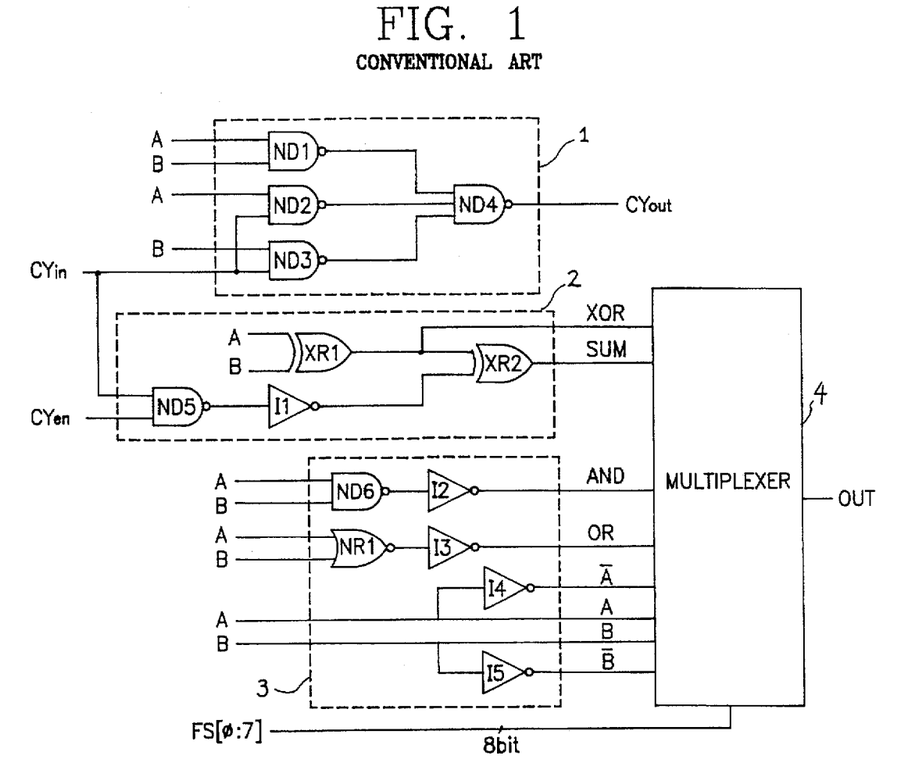
FIG. 1 is a block diagram showing a construction of cells adapted in a conventional arithmetic logic unit circuit.

The cells adapted in a conventional arithmetic logic unit circuit, as shown in FIG. 1, includes a carry generating circuit 1 for generating a carry CYout signal at a current cell by logically operating upon input data A and B and a carry CYin signal outputted from an externally connected cell, a First logic operation circuit 2 for outputting the result XOR obtained by exclusive OR-ing the input data A and B and for also outputting the sum of a result XOR obtained by exclusively OR-ing the sum with the result obtained by AND-ing a carry, enable signal Cyen outputted from a main control apparatus(not shown) with the carry Cyin signal outputted from an externally connected cell, a second logic operation circuit 3 for outputting a value AND obtained by AND-ing the input data A and B, for outputting a value OR obtained by OR-tag the data A and B and for outputting the values A and B and also the values /A and /B obtained by inverting the input data A and B, and a multiplexer 4 for selectively outputting one value among the values outputted from the first and second logic operation circuits 2 and 3 in accordance with a selection signal FS[0:7] outputted from the main control apparatus.

The operation of the cells adapted in the conventional arithmetic logic unit circuit will now be explained.

In the carry generating circuit 1, the NAND-gate ND1 NANDs the data A and B inputted thereto, the NAND-gate ND2 NANDs the data A inputted thereto and the carry CYin outputted item the externally connected cells, the NAND-gate ND3 NANDs the data B inputted thereto and the carry CYin. Thereafter, the NAND-gate ND4 NANDs the values outputted from the NAND-gates ND1, ND2 and ND3 and outputs the carry CYout at the current cell, which may be expressed as the Boolean function "Cyout=A*B+A*CYin+B*CYin."

In the first logic operation circuit 2, the exclusive OR-gate XR1 exclusively ORs the data A and B inputted thereto and outputs the ORed result XOR to the exclusive OR-gate XR2 and the multiplexer 4. In addition, the NAND-gate ND5 NANDs the carry CYin and the carry enable signal CYen. Thereafter, the inverter I1 inverts the output signal of the NAND-gate ND5 outputs the inverted signal to the exclusive OR-gate XR2. The exclusive OR-gate XR2 exclusively ORs the output value XOR of the exclusive OR-gate XRI and the output value of the inverter and outputs "SUM= (A*B+A*B)*CYin+(A*B+A*B)*CYin" to the multiplexer 4.

Therefore, the exclusive OR-gate XR2 outputs the sum of the data A and B are added thereto, at this time, if the carry enable signal CYen is "1," the exclusive OR-gate XR2 performs the operation by including the carry CYin outputted from an externally connected cell, and if the carry enable signal CYen is "0," the exclusive OR-gate XR2 performs the operation without including the carry CYin outputted from an externally connected cell.

In the second logic operation circuit 3, the NAND-gate ND6 NANDs the data A and B inputted thereto, the inverter I2 inverts the output value of the NAND-gate ND6 and outputs the inverted value to the multiplexer 4. In addition, the NOR-gate NR1 NORs the data A and B inputted thereto and the inverter I3 inverts the output value of the NOR-gate NR1 and outputs the inverted value OR to tho multiplexer 4. In addition, the second logic operation circuit 3 directly outputs the data A and B to the multiplexer 4, and at the same time outputs the data /A and /B which are inverted by the inverters 14 and 15 to the multiplexer 4.

Therefore, the multiplexer selects one data among the data outputted from the first and second logic operation circuits 2 and 3 in accordance with the selection signal FS[0:7].

Figure 2:
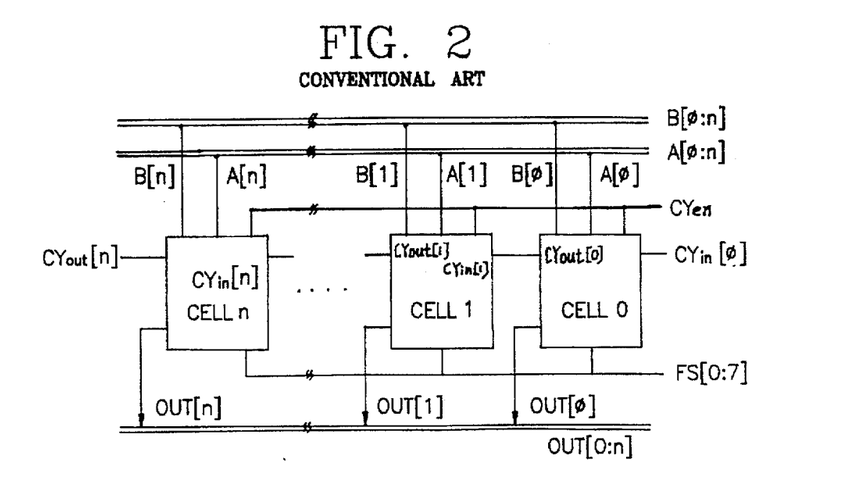
FIG. 2 is a block diagram showing a conventional arithmetic logic unit circuit.

As shown in FIG. 2, the conventional arithmetic unit circuit consists of a plurality of cells having extended according to the bits That is, a plurality of cells CELL0 to CELLn are connected in order with each other, and the data A[0:n] and B[0:n] are inputted into each of cells CELL0 to CELLn, respectively, and at the same time, each of the cells CELL0 to CELLn outputs corresponding values which are selected by the selection signal FS[0:7], and the output values OUT0 to OUTn of each cell become the output values of the arithmetic logic unit circuit. Meanwhile, the carry enable signal CYen outputted from the main control apparatus is applied to each of the CELL0 to CELLn of the arithmetic logic unit circuit.

However, since he carry operation in the conventional arithmetic logic unit circuit occurs in accordance with the operation of two NAND-gates, the propagation delay is increased due to using the logic gates, so that a higher speed arithmetic logic unit operation is disadvantageously impossible. In addition, since as the bits of the data increase, the number of the logic gates required in the first and second arithmetic logic unit circuit is increased, whereby the number of the logic gates to be used therein is also increased.

SUMMARY OF THE INVENTION

Accordingly, it is an object of the present invention to provide an arithmetic logic unit circuit which overcomes the limitation of the conventional art.

It is another objet of the present invention to provide an improved arithmetic logic unit circuit capable of advantageously reducing propagation delays and performing higher speed arithmetic logic operation by minimizing the number of logic gates required.

To achieve the above objects, there is provided the arithmetic logic unit circuit, which includes an even bit arithmetic logic unit cell for logically operating upon the even bits of a first and second data in accordance with an inverted carry, an inverted carry enable signal and an operation control signal and for generating a carry out signal; and an odd bit arithmetic logic unit cell for logically operating upon the odd bits of the first and second data in accordance with a carry in signal, a carry enable signal and an operation control signal and for generating a carry out signal.

DETAILED DESCRIPTION OF THE INVENTION

Figure 3A:
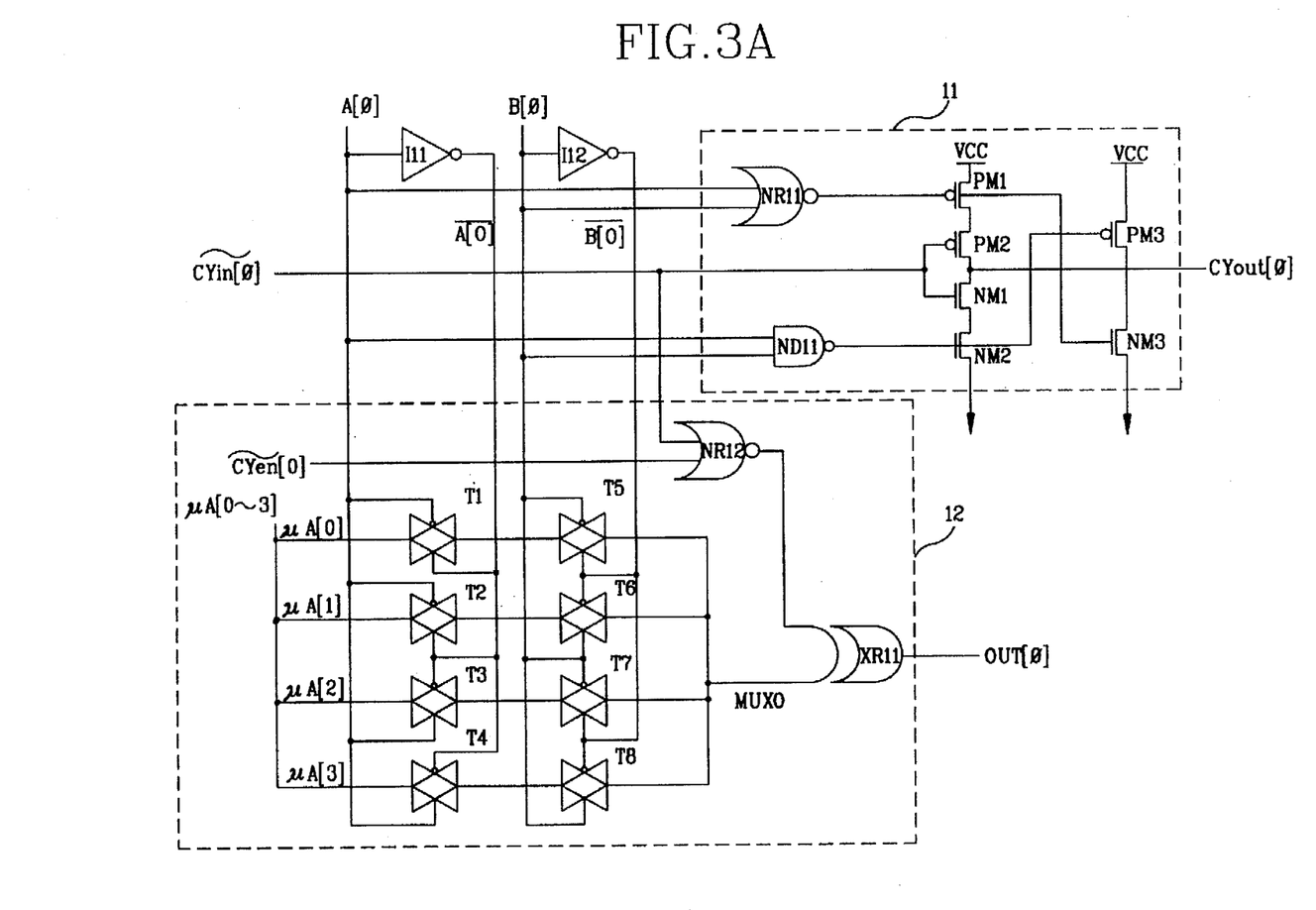
FIG. 3A is a block diagram showing a construction of cells adapted in an arithmetic logic unit circuit according to the present invention.
Figure 3B:
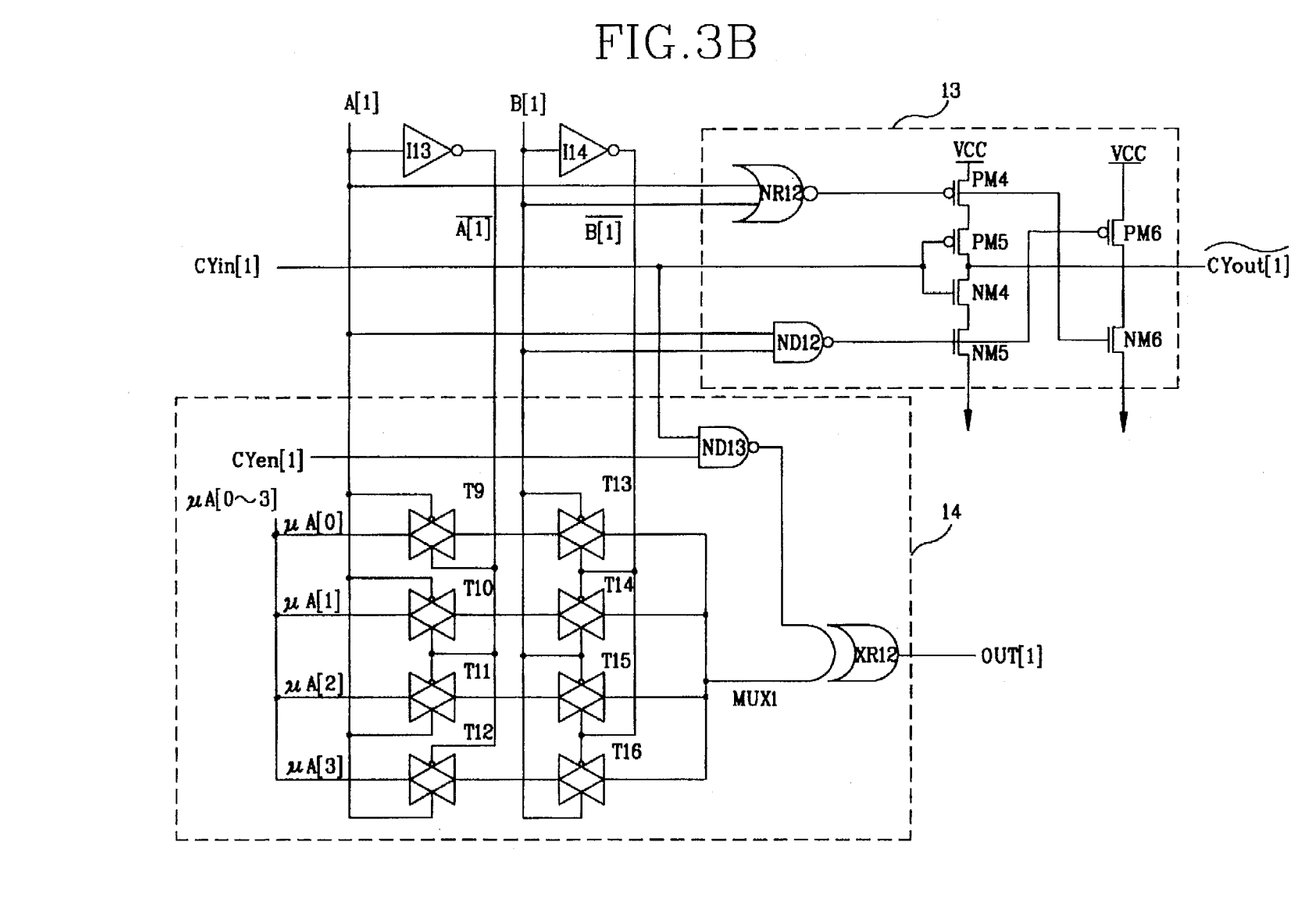
FIG. 3B is a block diagram showing a construction of cells adapted in an arithmetic logic unit circuit according to the present invention.

The cells of the arithmetic logic unit circuit according to the present invention, as shown in FIGS. 3A and 3B consist of even bit arithmetic logic unit cells and the odd bit arithmetic logic unit cells.

As shown in FIG. 3A, the even bit arithmetic logic, unit cell includes an even bit carry generating circuit 11 for outputting a carry CYout[0] signal by logically operating upon the even bits A[0] and B[0] of the first and second data A and B inputted thereto and an inverted carry CYin[0] outputted from externally connected cell, and an even bit arithmetic logic unit circuit 12 for outputting a result value OUT[0] by logically operating upon the even bits A[0] and B[0] of the first and second data inputted thereto, the inverted bits /A[0] and /B[0] of the even bits A[0] and B[0] inverted at the inverters I11 and I12, an inverted carry in signal CYin[0] outputted from an externally connected cell, an inverted enable signal /CYen and operation control signals μA[0]~μ[3] which are outputted from the main control apparatus(not shown).

Here, in the even bit carry generating circuit 11, the NOR-gate NR11 NORs the even bits A[0] and B[0] of the data A and B inputted thereto, the NAND-gate ND11 NANDs the even bits A[0] and B[0] of the data A and B inputted thereto.

PMOS transistors PM1 and PM2 and NMOS transistors NM1 and NM2 are respectively and serially connected between an externally connected voltage Vcc and ground.

The output signal of the NOR-gate NR11 is applied to the gate of the PMOS transistor PM1, the inverted carry in signal /CYin[0] is applied to the gates of the PMOS transistor PM2 and the NMOS transistor NM1, respectively, and the output signal of the NAND gate ND 11 is applied to the gate of the NMOS transistor NM2.

PMOS transistor PM3 and NMOS transistor NM3 are respectively serially connected between the externally connected voltage Vcc and ground.

The output signal of the NAND gate ND11 is also applied to the gate of the PMOS transistor PM3, and the output signal of the NOR-gate NR11 is also applied to the gate of the NMOS transistor NM3.

The connecting point between the drains of the PMOS transistor PM2 and the NMOS transistor NM1 and the connecting point between the drains of the PMOS transistor PM3 and the NMOS transistor NM3 are commonly connected and the carry out signal CYout[0] is outputted therefrom. Here, the external voltage Vcc is supplied to the PMOS transistors PM1 and PM3, respectively, and the sources of the NMOS transistors NM2 and NM3 are respectively grounded.

In addition, the even bit arithmetic logic unit circuit 12 includes a NOR-gate NR12 for NOR-ing the inverted carry in signal /CYin[0] outputted from the externally connected cell and the inverted carry enable signal /CYen, parallel connected transmission gates T1 to T4 for transmitting the operation control signals μA[0]~μ[3] outputted from the main control apparatus in accordance with the even bit A[0] of the first data inputted thereto and the inverted even bit /A[0] inverted by the inverter I11, parallely connected transmission gates T5 to T8 for transmitting the output signal of the transmission gates T1 to T4 in accordance with the inverted even bit /B[0] of the second data inputted thereto and the even bit B[0] inverted by the inverter I12, and an exclusive OR-gate XR11 for outputting a result value OUT[0] obtained by exclusively OR-ing the common output signal MUXO of the transmission gates T5 to T8 and the output signal of the NOR-gate NR12.

Here, the even bit A[0] of the first data is applied to the gates of the PMOS transistors of the transmission gates TI and T2 and the gates of the NMOS transistor of the transmission gates T3 and T4, respectively. In addition, the inverted even bit /A[0] of the first data is applied to the gates of the NMOS transistors of the transmission gates T1 and T2 and the gates of the PMOS transistors of the transmission gates T3 and T4, respectively. In addition, the even bit B[0] of the second data is applied to the gates of the PMOS transistors of the transmission gates T5 and T7 and the gates of the NMOS transistors of the transmission gates T6 and T8, respectively. In addition, the inverted even bit /B[0] of the second dam is applied to the gates of the NMOS transistors of the transmission gates T5 and T7 and the gate of the PMOS transistor of the transmission gates T6 and T8, respectively.

Meanwhile, the odd bit arithmetic logic unit cell as shown in FIG. 3B, includes an odd bit my generating circuit 13 for outputting the inverted carry out signal CYout[1] by logically operating upon the inverted odd bits /A[1] and /B[1] of the first and second data A and B which are respectively inverted by the inverters I13 and I14 and the, carry in signal CYin[1] outputted from an externally connected cell, and an odd bit arithmetic logic unit circuit 14 for outputting a result value OUT[1] by logically operating upon the odd bits A[1] and B[1] of the first and second data A and B inputted thereto, the inverted odd bits /A[1] and /B[1] which are respectively inverted by the inverters I13 and I14, the carry in signal CYin[1] outputted from an externally connected cell, a carry enable signal CYen and operation control signals μA[0]~μ[3] which are respectively outputted from the main control apparatus.

Here, the odd bit carry generating circuit 13 has the same construction as the even bit carry generating circuit 11, and the input/output signals exist in the inverted form. In addition, the odd bit arithmetic logic, unit circuit 14 has the same function as the even bit arithmetic logic unit circuit 13, except that, differently from the even bit circuit 12 having NOR gate NR12 and XOR gate XR11 shown in FIG. 3A, in the odd bit circuit 14 of FIG. 3B, a NAND gate ND13 NANDs the carry in signal CYin[1] and the carry enable signal CYen, and an exclusive OR-gate XR12 exclusively ORs the common output signal MUXO of the transmission gates T13 and T16 end the inverted output signal of the NAND-gate ND13.

The operation of the arithmetic logic unit circuit according to the present invention will now be explained.

To begin with, in the even bit carry generating circuit 11, if the oven bits A[0] and B[0] of the first and second data are "1," respectively, the NOR-gate NR11 and the NAND-gate ND11 of the even bit carry generating circuit 11 output "0." Therefore, the PMOS transistor PM1 is turned on in accordance with the output signal of the NOR-gate NR11, and the NMOS transistor NM3 is turned off, the PMOS transistor PM3 is turned on in accordance with the output signal of the NAND gate ND11, and the NMOS transistor NM2 is turned on, so that the carry out signal CYout[0] becomes "1," being not subject to the carry in signal CYin[0].

In addition, if either of the even bits A[0] or B[0] of the first and second data is "1," the NOR-gate NR11 of the carry generating circuit 11 outputs "0," and thereafter the NAND-gate ND11 outputs "1," so that the PMOS transistor PM1 and the NMOS transistor NM2 are turned on. Thereafter, in only the case that the inverted carry in signal CYin[0] is "0," the PMOS transistor PM2 is turned on because the carry in signal CYin[0] is "1," and then the carry out signal CYout[0] becomes "1." In addition, if all the even data bits A[0] and B[0] of the first and second data are "0," the carry out signal CYout[0] is "0," because all the NOR-gate NR11 and the NAND-gate ND11 both output "1," Therefore, the even bit carry generating circuit 11 outputs a proper carry out signal CYout[0] in accordance with the state of the even bits A[0] and B[0] of the data inputted thereto and the carry in signal CYin[0].

Figure 4:
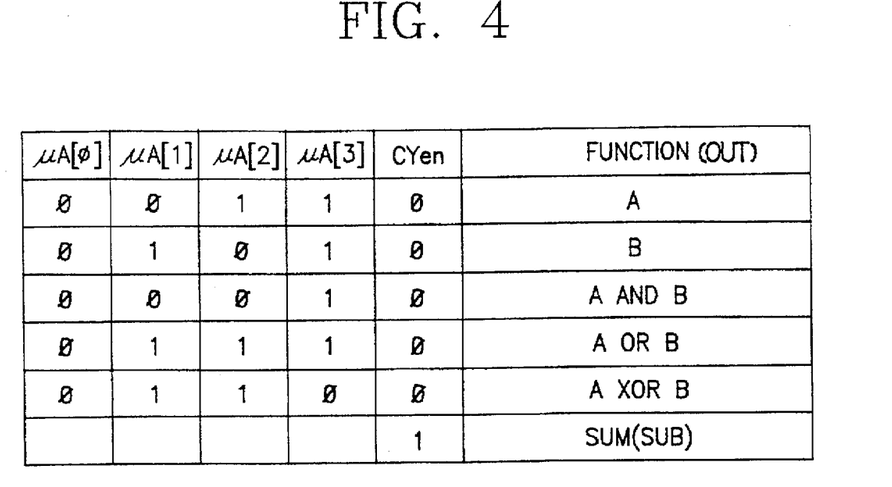
FIG. 4 is a table showing values outputted in accordance with an operation control signal and a carry enable signal in an arithmetic logic unit circuit according to the present invention.

Next, the operation of the even bit arithmetic logic unit circuit 12 according to the present invention will now be explained with reference to FIGS. 4 and 5.

To begin with if the operation control signals µA[0]–µA[3] are "0011," and the even bit A[0] of the first data is "1," the transmission gate T1 and T2 are turned on, respectively, and the transmission gates T3 and T4 are turned off. At this time, since the operation control signals µA[0]–µA[1] applied to the transmission gates T1 and T2 are "00," the transmission gates T1 and T2 output "0," respectively, so that the transmission gates T3 and T4 are disenabled. In addition, if the even bit A[0] of the first data is "1," the transmission gates T3 and T4 are turned on and the transmission gates T1 and T2 are turned off, and thereafter the transmission gates T3 and T4 transmit "1," respectively. At this time, if the even bit B[0] of the second data is "0," the transmission gates T5 and T7 are turned on and the transmission gates T6 and T8 are turned off. Therefore, as the transmission gate T7 transmits the output signal "1" of the transmission gate T3, the MUXO signal is "1." In addition, if the even bit B[0] of the second data is "1," the transmission gates T6 and T8 are turned on and the transmission gates T5 and T7 are turned off. Therefore, as the transmission gate T8 transmits the output signal "1" of the transmission gate T4, the MUXO signal is "1." That is, if he operation control signals µA[0]–µA[3] are "0011," the MUXO signal is "1" in the case that the even bit A[0] of the first data is "1."

In addition, if the carry enable signal CY en is "0," the inverted carry enable signal /CYen is inputted to the NOR-gate NR12, so that the NOR-gate NR12 outputs "0" to the exclusive OR-gate XR11, being not subject to the state of the carry in signal CYin[0] which is inputted to the other input of NOR-gate NR12. Thereafter, the exclusive OR-gate XR11 outputs the value of the MUXO line. Therefore, the operation control signals µA[0]–µA[3] are "0011," and the carry enable signal CYen is "0," the result OUT[0] outputted from the even bit arithmetic logic unit circuit 12 is "A," namely, the value of the MUXO line.

In addition, in the state that the carry enable signal CYen is "0," if the operation control signals µA[0]–µA[3] are "0101," the result OUT[0] outputted from the even bit arithmetic logic unit circuit 12 is obtained from exclusive gate XR11 is "B," whereas if the operation control signals are "0001," the result is obtained by exclusively OR-ing "A and B," if the operation control signals are "0111," the result is obtained by OR-ing "A or B," and if the operation control signals is "0110," the result is obtained by exclusively OR-ing "A[0] or B[0]."

Meanwhile, the addition operation performed in the state that the carry enable signal CYen is "1" and the operation control signals µA[0]–µA[3] are "0110" will now be explained with reference to FIG. 5.

Figure 5:
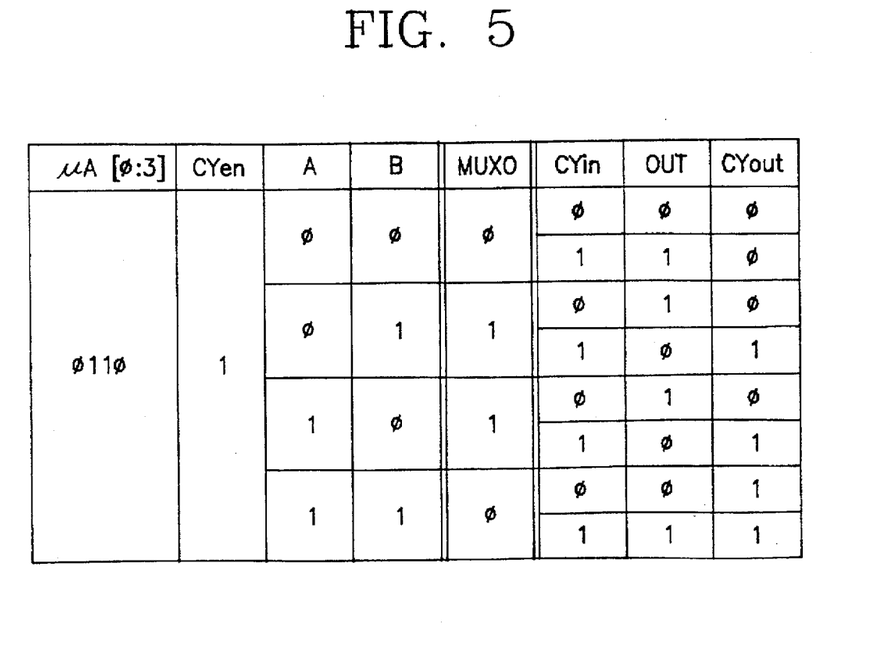
FIG. 5 is a table showing a relationship between input/output of data in case that addition and subtraction operations are performed in an arithmetic logic unit circuit according to the present invention.

If the even bits A[0] and B[0] of the data inputted thereto are "00," the MUXO line value is "0." At this time, if the carry in signal CYin[0] is "0," the NOR-gate NR12 NORs the inverted carry enable signal CYen "0" and the inverted carry in signal CYin[0] "1" and outputs "0." Therefore, the exclusive OR-gate XR11 outputs "0" because the signals inputted thereto are "0." Meanwhile, if the carry in signal CYin[0] is "1," the NOR-gate NR12 outputs "1" and then the exclusive OR-gate XR11 outputs "1." In the same manner, when the carry enable signal CYen is "1," the result obtained in accordance with the even bits A[0] and B[0] of the first and second data and the state of the carry in signal CYin[0] inputted thereto is shown, in FIG. 5.

Meanwhile, when the subtraction operation "A minus B" is performed at the arithmetic logic unit circuit 12 on the even bits, the carry enable signal CYen becomes "1," and the same operation is performed as in the addition operation.

The odd bit carry generating circuit 13 as shown in FIG. 3B logically operates upon the inverted odd bits A[1] and B[1] of the first and second data and the carry in signal CYin[1] outputted from the externally connected even bit carry generating circuit 12. In addition, the odd bit arithmetic logic unit circuit 14 logically operates upon the odd bits A[1] and B[1] of the first and second data, the inverted signals /A[1] and /B[1] inverted at the inverters I13 and I14, and the operation control signals µA[0]–µB[1] and the carry enable signal CYen which are outputted from the main control apparatus and then outputs the result OUT[1].

The operation of the odd bit carry generating circuit 13 and the odd bit arithmetic logic unit circuit 14 is the same as the even bit carry generating circuit 11 and the even bit arithmetic logic unit circuit 12, so explanation thereof is omitted.

Figure 6:
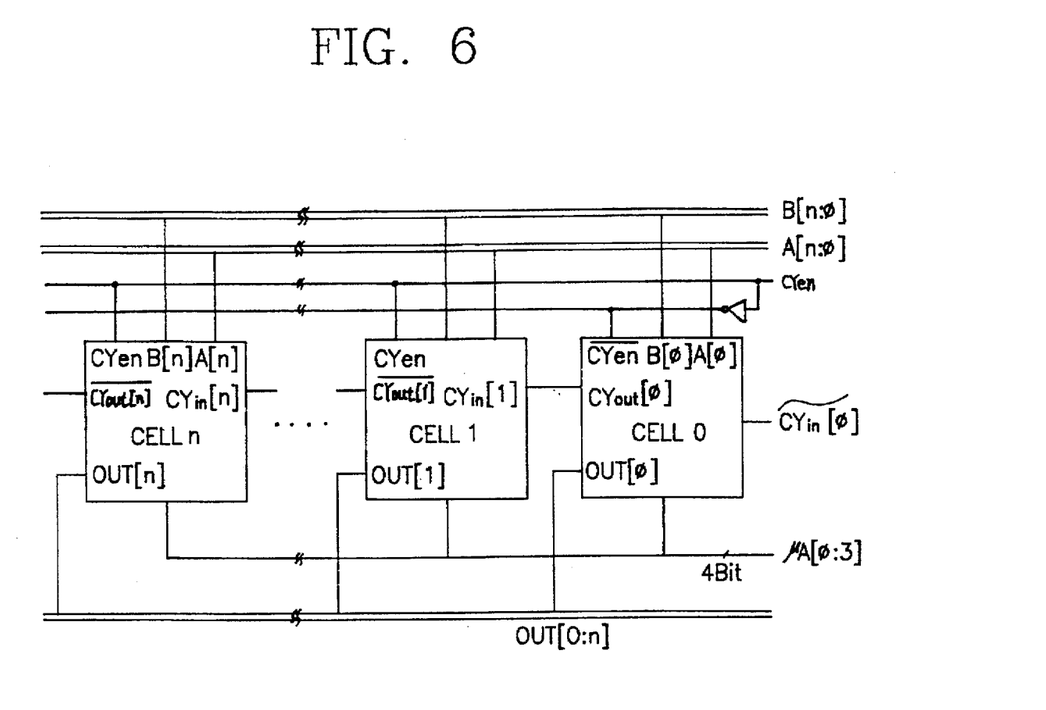
FIG. 6 is a block diagram showing a construction of an arithmetic logic unit circuit according to the present invention.

In FIG. 6, there is shown a construction of the arithmetic logic unit circuit for performing the multi-bit operations constructed of alternatively connected odd bid arithmetic logic unit cells and the even bit arithmetic logic unit cells. That is, at the lowest position, an even bit arithmetic logic unit cell is located, and at the next position to that an odd bit arithmetic logic trail cell is located. In addition, the bits A[0] to A[n] and B[0] to B[n] respectively corresponding to the first and second data A and B are inputted to each cell thereof. The carry enable signal CYen is inverted and inputted to the even bit arithmetic logic unit cells, and the carry enable signal CYen is inputted to the odd bit arithmetic logic unit cells without inversion. The carry in signal CYin[0] is applied to the arithmetic logic unit cell of the lowest bit, and the carry out signal CYout outputted therefrom is applied to the carry in CYin of the next arithmetic logic unit cell thereafter. In addition, the control signals µA[0]–µA[3] are commonly applied to each arithmetic logic unit cell, and the output values OUT[0] to OUT[n] of each cell are commonly connected to output the output value OUT[0:n] of the arithmetic logic unit circuit.

Accordingly, the arithmetic logic unit circuit according to the present invention minimizes the number of logic gates which are subject to processing a carry occurrence, and the propagation delay due to the logic gates is thereby advantageously reduced, thereby achieving the high speed arithmetic logic unit operation as well as reducing the size of chips.

What claimed is:

1. An arithmetic logic unit (ALU) comprising:
   a) a first cell for performing a first arithmetic operation based on even bits of first and second data, said first cell including
      i) first means for generating a first carry out signal based on at least one of a first carry-in signal and even bits of said first and second data, and
      ii) a first logic unit having a first group of transmission gates, responsive to said even bits of said first and second data, for outputting one of a plurality of control signals as a first signal, and a first logic means for performing a first logical operation between said first signal and at least one of a first enable signal and said first carry-in signal to generate a first output signal; and
   b) a second cell, coupled to said first cell, for performing a second arithmetic operation based on odd bits of the first and second data.

2. The ALU of claim 1, wherein said second cell includes:
   i) a second means for generating a second carry out signal based on at least one of a second carry-in signal and odd bits of said first and second data, and
   ii) a second logic unit having a second group of transmission gates, responsive to said odd bits of said first and second data, for outputting one of said plurality of control signals as a second signal, a second logic means for performing a second logical operation between said second signal and at least one of a second enable signal and said second carry-in signal to generate a second output signal.

3. The ALU of claim 2, wherein said first generating means comprises:
   first and second logic circuits performing different logical operations from each other to output first and second logical output signals, respectively, based on said even bits of said first and second data; and
   a plurality of transistors responsive to said first and second logical output signals and said first carry-in signal to output said first carry out signal.

4. The ALU of claim 2, wherein said first and second logic circuits are NOR and NAND logic circuits, respectively.

5. The ALU of claim 4, wherein said first generating means and said first group of transmission gates have the same arrangement of components as said second generating means and said second group of transmission gates.

6. The ALU of claim 2, wherein said first group of transmission gates comprises a first plurality of transmission gates which are responsive to said first data, and a second plurality of transmission gates which are correspondingly coupled to said first plurality of transmission gates and are responsive to said second data to output one of said plurality of control signals.

7. The ALU of claim 2, wherein said first logic means comprises:
   a first logic circuit performing a first logical operation based on said first carry-in and carry enable signals to output a first logical output signal; and
   a second logic circuit performing a second logical operation based on said first logical output signal and said first signal to output said first output signal.

8. The ALU of claim 7, wherein said first and second logic circuits are NOR and XOR logic circuits, respectively.

9. The ALU of claim 2, wherein said second generating means comprises:
   first and second logic circuits performing different logical operations from each other to output first and second logical output signals, respectively, based on said odd bits of said first and second data; and
   a plurality of transistors responsive to said first and second logical output signals and said second carry-in signal to output said second carry out signal.

10. The ALU of claim 9, wherein said first and second logic circuits are NOR and NAND logic circuits, respectively.

11. The ALU of claim 2, wherein said second group of transmission gates comprises a first plurality of transmission gates which are responsive to said first data, and a second plurality of transmission gates which are correspondingly coupled to said first plurality of transmission gates and are responsive to said second data to output one of said plurality of control signals.

12. The ALU of claim 2, wherein said first logic means comprises:
   a first logic circuit performing a first logical operation based said second carry-in and carry enable signals to output a second logical output signal; and
   a second logic circuit performing a second logical operation based on said second logical output signal and said second signal to output said second output signal.

13. The ALU of claim 12, wherein said first and second logic circuits are NAND and XOR logic circuits, respectively.

14. A cell for performing an arithmetic operation based on first and second data, comprising:
   means for generating a carry out signal based on at least one of a carry-in signal and said first and second data; and
   a logic unit having
      a group of transmission gates, responsive to said first and second data, for outputting one of a plurality of control signals as a first signal; and
      logic means for performing a logical operation between said first signal and at least one of an enable signal and said carry-in signal to generate an output signal.

15. The cell of claim 14, wherein said generating means comprises:
   first and second logic circuits performing different logical operations from each other to output first and second logical output signals, respectively, based on said first and second data; and
   a plurality of transistors responsive to said first and second logical output signals and said carry-in signal to output said carry out signal.

16. The cell of claim 15, wherein said first and second logic circuits are NOR and NAND logic circuits, respectively.

17. The cell of claim 14, wherein said group of transmission gates comprises:
   a first plurality of transmission gates which are responsive to said first data, and
   a second plurality of transmission gates which are correspondingly coupled to said first plurality of transmission gates and are responsive to one of said first and second data to output one of said plurality of control signals.

18. The cell of claim 14, wherein said logic means comprises:
   a first logic circuit performing a first logical operation based on said carry-in and carry enable signals to output a logical output signal; and
   a second logic circuit performing a second logical operation based on said logical output signal and said first signal to output said output signal.

19. The cell of claim 18, wherein said first and second logic circuits are NOR and XOR logic circuits, respectively.

20. The cell of claim 18, wherein said first and second logic circuits are NAND and XOR gates, respectively.

21. A logic unit circuit for performing an arithmetic operation based on first and second data and a plurality of control signals in response to a carry-in signal and an enable signal, comprising:
   a first plurality of transmission gates responsive to the first data to output corresponding control signals;
   a second plurality of transmission gates, which are correspondingly coupled to outputs of said first plurality of transmission gates, for receiving one of said first and second data to output one of the plurality of control signals; and
   logic means for performing a logical operation between one of the plurality of control signals outputted by said second plurality of transmission gates and one of the enable signal and the carry-in signal to generate an output signal.

22. The logic unit circuit of 36, wherein said logic means comprises:
   a first logic gate for performing a first logical operation based on the carry-in signal and the enable signal to output a first logical output signal, and
   a second logic gate for performing a second logical operation based on said logical output signal and output of said second plurality of transmission gates to output said output signal.

23. The logic unit circuit of claim 22, wherein said first and second logic gates are NOR and XOR gates, respectively.

24. The logic unit circuit of claim 22, wherein said first and second logic gates are NAND and XOR gates, respectively.

* * * * *